(12) United States Patent
Yeom et al.

(10) Patent No.: US 12,724,556 B2
(45) Date of Patent: Sep. 1, 2026

(54) MEMORY SYSTEM FOR STORING META DATA AND OPERATING METHOD THEREOF

(71) Applicant: SK hynix Inc., Icheon-si (KR)

(72) Inventors: Yun Jung Yeom, Icheon-si (KR); Hyo Jae Lee, Icheon-si (KR)

(73) Assignee: SK hynix Inc., Icheon-si Gyeonggi-do (KR)

( * ) Notice: Subject to any disclaimer, the term of this patent is extended or adjusted under 35 U.S.C. 154(b) by 468 days.

(21) Appl. No.: 17/473,727

(22) Filed: Sep. 13, 2021

(65) Prior Publication Data

US 2022/0308760 A1 Sep. 29, 2022

(30) Foreign Application Priority Data

Mar. 24, 2021 (KR) ........................ 10-2021-0038253

(51) Int. Cl.
*G06F 3/06* (2006.01)

(52) U.S. Cl.
CPC ............ *G06F 3/064* (2013.01); *G06F 3/0604* (2013.01); *G06F 3/0631* (2013.01); *G06F 3/0656* (2013.01); *G06F 3/0659* (2013.01); *G06F 3/0673* (2013.01)

(58) Field of Classification Search
CPC ...... G06F 3/064; G06F 3/0604; G06F 3/0631; G06F 3/0656; G06F 3/0659; G06F 3/0673; G06F 3/061; G06F 3/0679; G06F 3/0652; G06F 3/0658; G06F 12/0246;
(Continued)

(56) References Cited

U.S. PATENT DOCUMENTS

| | | | | |
|---|---|---|---|---|
| 10,877,900 | B1 * | 12/2020 | Muthiah | G06F 9/4411 |
| 11,003,586 | B1 * | 5/2021 | Lercari | G06F 3/0688 |
| 11,256,620 | B1 * | 2/2022 | Brandt | G06F 12/0802 |

(Continued)

FOREIGN PATENT DOCUMENTS

| | | | |
|---|---|---|---|
| CN | 109815159 | A | 5/2019 |
| CN | 110362423 | A | 10/2019 |

(Continued)

OTHER PUBLICATIONS

Soojun Im, Dongkun Shin, ComboFTL: Improving performance and lifespan of MLC flash memory using SLC flash buffer, Journal of Systems Architecture, vol. 56, Issue 12, 2010, pp. 641-653, ISSN 1383-7621, https://doi.org/10.1016/j.sysarc.2010.09.005. (Year: 2010).*

(Continued)

*Primary Examiner* — Masud K Khan
(74) *Attorney, Agent, or Firm* — WILLIAM PARK AND ASSOCIATES LTD.

(57) ABSTRACT

The present technology relates to a memory system and a method of operating the same. The memory system includes a semiconductor memory device including a plurality of meta blocks and a plurality of normal blocks, and a controller for controlling the semiconductor memory device to generate meta data and store the generated meta data in a target meta block selected from among the plurality of meta blocks. The controller converts an address so that the address of the meta data corresponds to a selected sub block of the selected target meta block.

8 Claims, 10 Drawing Sheets

(58) Field of Classification Search
CPC ......... G06F 12/0284; G06F 2212/1016; G11C 16/08; G11C 16/14
See application file for complete search history.

(56) References Cited

U.S. PATENT DOCUMENTS 11,301,330 B2* 4/2022 Shveidel ............. G06F 11/1471
2003/0229753 A1* 12/2003 Hwang ................. G06F 3/0679 711/E12.008
2006/0239075 A1* 10/2006 Williams ............... G11C 16/10 365/185.17
2007/0033372 A1* 2/2007 Everhart ................. G06F 3/067 711/202
2007/0230691 A1* 10/2007 Elhamias .............. H04L 9/0637 380/37
2010/0172179 A1* 7/2010 Gorobets ............ G06F 12/0246 365/185.11
2011/0072300 A1* 3/2011 Rousseau .............. G06F 3/0619 711/E12.001
2012/0204193 A1* 8/2012 Nethercutt .......... G06F 11/3495 719/330
2013/0238833 A1* 9/2013 Vogan ................. G06F 12/0246 711/E12.008
2014/0136760 A1* 5/2014 Sprouse ................ G06F 3/0679 365/185.17
2014/0189200 A1* 7/2014 Gavens ................... G06F 12/10 711/103
2014/0359382 A1* 12/2014 Choi ................... G06F 12/0246 714/710
2015/0220269 A1* 8/2015 Lee ....................... G06F 3/0679 711/103
2015/0339070 A1 11/2015 Lee et al.
2016/0232168 A1* 8/2016 LeMoal .............. G06F 11/1435
2016/0306723 A1 10/2016 Lu
2017/0139643 A1* 5/2017 Byun .................... G06F 3/0679
2017/0139837 A1* 5/2017 Tomlin .................. G06F 3/0644
2017/0147211 A1* 5/2017 Shiah ..................... G11C 16/06
2018/0046538 A1* 2/2018 Zhang ................... G06F 3/0644
2018/0053543 A1 2/2018 Lee
2018/0061501 A1* 3/2018 Lim ....................... G11C 16/16
2018/0107408 A1* 4/2018 Sterns ................... G06F 3/0665
2018/0150357 A1* 5/2018 Shen ................... G06F 11/1441
2019/0171384 A1* 6/2019 Inbar ................... G06F 11/3034
2019/0370167 A1* 12/2019 Widder ................... G06F 3/061
2020/0019532 A1* 1/2020 Kashi Visvanathan ...................... G06F 16/2365
2020/0042460 A1* 2/2020 Oh ...................... G06F 12/0246
2020/0241789 A1* 7/2020 Soukhman .............. G06F 3/064
2020/0241796 A1* 7/2020 Sugahara ............ G06F 12/0246
2021/0011645 A1* 1/2021 Martinelli .............. G11C 5/025
2021/0055953 A1* 2/2021 Gupta ................... G06F 16/182
2021/0118488 A1* 4/2021 Kim ....................... G06N 3/063
2021/0255803 A1* 8/2021 Kanno .................... G06F 3/061
2022/0083221 A1* 3/2022 Agarwal ............. G06F 12/0246
2022/0291836 A1* 9/2022 Tran ...................... G06F 3/0626

FOREIGN PATENT DOCUMENTS

CN 110554836 A 12/2019
KR 1020170084467 A 7/2017

OTHER PUBLICATIONS

Electronic Design Applications, 07, SSD, Current status and future prospects, https://www.cnki.net.
Guan-Quan Lin, Zhen-Yu Wang, and Shyue-Kung LUBuilt-In Self Repair Techniques for Content Addressable Memories Dep. of Electronic Engineering, Fu Jen Catholic University, Taipei, Taiwan.
Li Wenbo, Research on Array Storage Technology, Full-text Database of Outstanding Masters Theses in China Information Technology, 2012, Flash, China Academic Journal Electronic Publishing House.
Zhao Jinchao, "Research on Key Technologies and Algorithms of Big Data", Cataloging-in-Publication (CIP) Data, pp. 103-106, Beijing University of Technology Press, Dec. 2018 (Reprinted May 2021) ISBN 978-7-5639-6512-0.

* cited by examiner 300
1000
200
100
HOST
CONTROLLER
SEMICONDUCTOR MEMORY DEVICE 100
150
120
110
VOLTAGE GENERATOR
Vpgm, Vread, Vpass
ADDRESS DECODER
WL
BLKz
BLK2
BLK1
BL1
BL2
BLm
PB1
PB2
PBm
CONTROL LOGIC
140
130
CMD, CTRL
DATA

Figure 9:
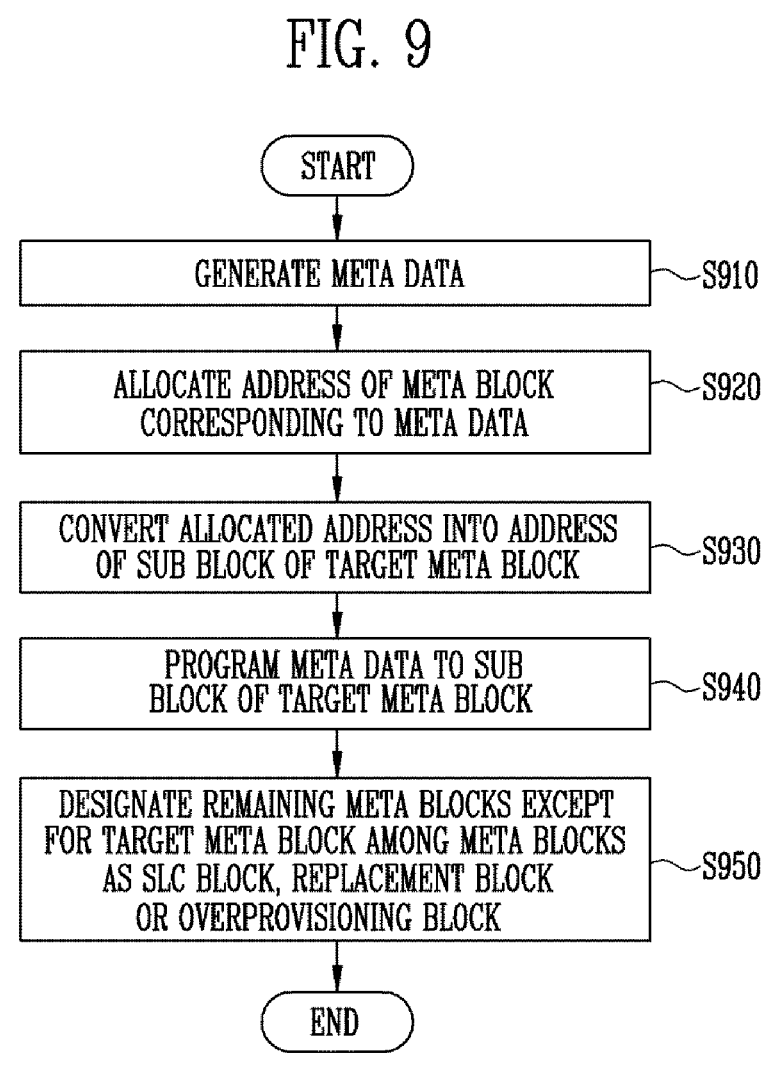

START

GENERATE META DATA ~S910

ALLOCATE ADDRESS OF META BLOCK CORRESPONDING TO META DATA ~S920

CONVERT ALLOCATED ADDRESS INTO ADDRESS OF SUB BLOCK OF TARGET META BLOCK ~S930

PROGRAM META DATA TO SUB BLOCK OF TARGET META BLOCK ~S940

DESIGNATE REMAINING META BLOCKS EXCEPT FOR TARGET META BLOCK AMONG META BLOCKS AS SLC BLOCK, REPLACEMENT BLOCK OR OVERPROVISIONING BLOCK ~S950

END

Figure 12:
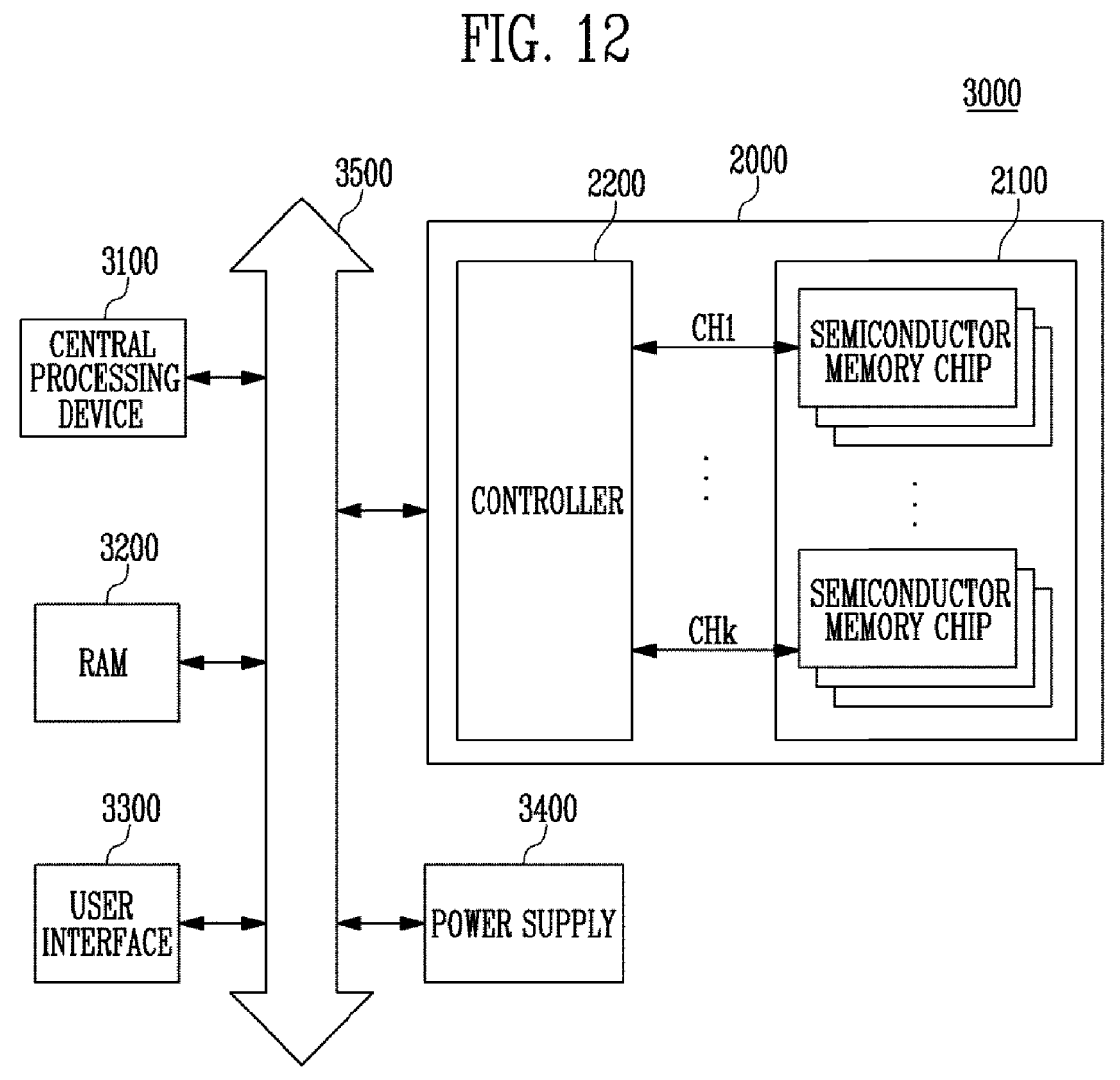

CENTRAL PROCESSING DEVICE

CH1

SEMICONDUCTOR MEMORY CHIP

CONTROLLER

3200

RAM

CHk

SEMICONDUCTOR MEMORY CHIP

3300

3400

USER INTERFACE

POWER SUPPLY

MEMORY SYSTEM FOR STORING META DATA AND OPERATING METHOD THEREOF

CROSS-REFERENCE TO RELATED APPLICATION

The present application claims priority under 35 U.S.C. § 119(a) to Korean patent application number 10-2021-0038253 filed on Mar. 24, 2021, in the Korean Intellectual Property Office, the entire disclosure of which is incorporated by reference herein.

BACKGROUND

1. Technical Field

The present disclosure relates to an electronic device, and more particularly, to a memory system and a method of operating the memory system.

2. Related Art

Recently, a paradigm for a computer environment has been transformed into ubiquitous computing, which enables a computer system to be used whenever and wherever. Therefore, a use of a portable electronic device such as a mobile phone, a digital camera, and a notebook computer is rapidly increasing. Such a portable electronic device generally uses a memory system that uses a memory device, that is, a data storage device. The data storage device is used as a main storage device or an auxiliary storage device of the portable electronic device.

The data storage device using the memory device has advantages that stability and durability are excellent because there is no mechanical driver, an access speed of information is very fast, and power consumption is low. As an example of the memory system having such advantages, a data storage device includes a universal serial bus (USB) memory device, a memory card having various interfaces, a solid state drive (SSD), and the like.

A memory device is largely divided into a volatile memory device and a nonvolatile memory device.

A write speed and a read speed of the nonvolatile memory device are relatively slow, however, the nonvolatile memory device maintains storage data even though power supply is shut off. Therefore, a nonvolatile memory device is used to store data to be maintained regardless of power supply. A nonvolatile memory device includes a read only memory (ROM), a mask ROM (MROM), a programmable ROM (PROM), an erasable programmable ROM (EPROM), an electrically erasable programmable ROM (EEPROM), a flash memory, a phase change random access memory (PRAM), a magnetic RAM (MRAM), a resistive RAM (RRAM), a ferroelectric RAM (FRAM), and the like. The flash memory is divided into a NOR type and a NAND type.

SUMMARY

According to an embodiment of the present disclosure, a memory system includes a semiconductor memory device including a plurality of meta blocks and a plurality of normal blocks, and a controller for controlling the semiconductor memory device to generate meta data and store the generated meta data in a target meta block selected from among the plurality of meta blocks. The controller converts an address so that the address of the meta data corresponds to a selected sub block of the selected target meta block.

According to an embodiment of the present disclosure, a memory system includes a semiconductor memory device including a plurality of meta blocks and a plurality of normal blocks, and a controller for controlling the semiconductor memory device to generate meta data and store the generated meta data in a target meta block selected from among the plurality of meta blocks. The controller controls the semiconductor memory device to store the meta data in at least one sub block among a plurality of sub blocks included in the target meta block selected from among the plurality of meta blocks.

According to an embodiment of the present disclosure, a method of operating a memory system includes generating meta data in response to a command received from a host, converting an address of the meta data into an address of a selected sub block of a target meta block selected from among a plurality of meta blocks included in a semiconductor memory device, and transmitting the meta data to the semiconductor memory device and storing the meta data in the selected sub block.

BRIEF DESCRIPTION OF THE DRAWINGS

FIG. 7 is a block diagram illustrating a controller and a semiconductor memory device according to an embodiment of the present disclosure.

FIG. 9 is a flowchart illustrating a method of operating a memory system according to an embodiment of the present disclosure.

FIG. 12 is a block diagram illustrating a computing system including the memory system described with reference to FIG. 11.

DETAILED DESCRIPTION

Specific structural or functional descriptions of embodiments according to the concept which are disclosed in the present specification or application are illustrated only to describe the embodiments according to the concept of the present disclosure. The embodiments according to the concept of the present disclosure may be carried out in various forms and should not be construed as being limited to the embodiments described in the present specification or application.

An embodiment of the present disclosure provides a memory system and a method of operating the memory system capable of improving performance of the memory system by efficiently utilizing meta blocks included in the memory system.

According to the present technology, one target meta block among the meta blocks included in the memory system may be divided into the plurality of sub blocks, and the plurality of sub blocks may be used as a meta data storage block, a replacement block, and an auxiliary block. In addition, performance of the memory system may be improved by using remaining meta blocks as an SLC block, a replacement block, and the like.

Figures 1, 2:
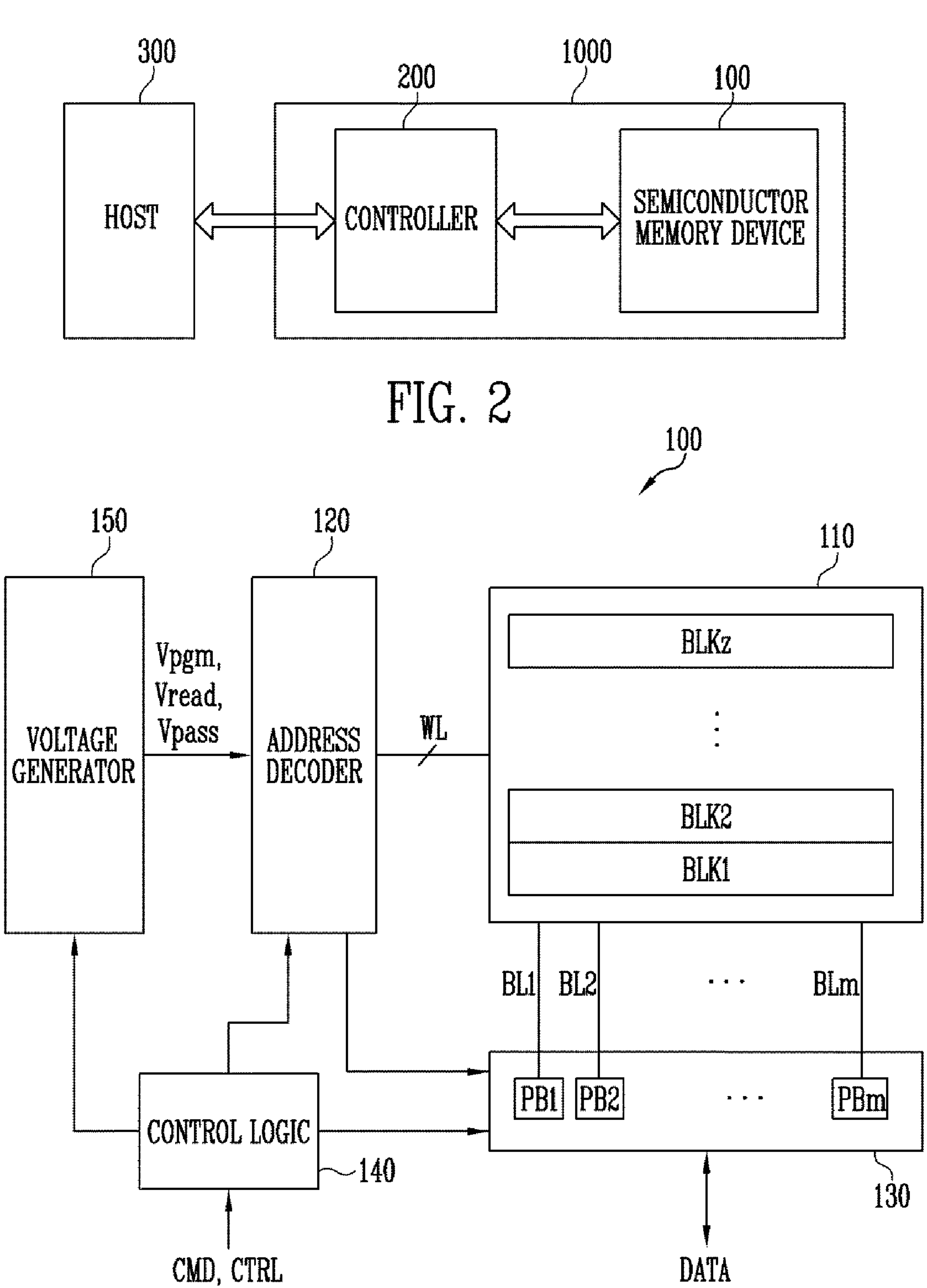
FIG. 1 is a block diagram illustrating a memory system according to an embodiment of the present disclosure.
FIG. 2 is a block diagram illustrating a semiconductor memory device of FIG. 1.

FIG. 1 is a block diagram illustrating a memory system according to an embodiment of the present disclosure.

Referring to FIG. 1, the memory system 1000 includes a semiconductor memory device 100 and a controller 200. In addition, the memory system 1000 communicates with a host 300. The controller 200 controls an overall operation of the semiconductor memory device 100. In addition, the controller 200 controls the operation of the semiconductor memory device 100 based on a command received from the host 300.

For example, when the controller 200 receives a command from the host 300, the controller 200 may generate meta data for a command operation corresponding to the command and program the generated meta data to the semiconductor memory device 100. For example, the meta data may include information on command data corresponding to the command received from the host 300, information on the command operation corresponding to the command, information on the memory blocks of the semiconductor memory device 100 on which the command operation is performed, information on map data corresponding to the command operation, and the like. For example, the meta data may include logical address-physical address mapping data of user data stored in a normal block among the memory blocks of the semiconductor memory device 100 or data generated and used by the controller 200 such as map scan information. In other words, the meta data may include information and data for the command operation except for the user data corresponding to the command received from the host 300. The semiconductor memory device 100 may receive the meta data from the controller 200 and store the received meta data in a meta block among the plurality of memory blocks.

FIG. 2 is a block diagram illustrating the semiconductor memory device of FIG. 1.

Referring to FIG. 2, the semiconductor memory device 100 includes a memory cell array 110, an address decoder 120, a read and write circuit 130, control logic 140, and a voltage generator 150. In an embodiment, the control logic 140 may be implemented as hardware, software, or a combination of hardware and software. For example, the control logic 140 may be a control logic circuit operating in accordance with an algorithm and/or a processor executing control logic code.

The memory cell array 110 includes a plurality of memory blocks BLK1 to BLKz. The plurality of memory blocks BLK1 to BLKz are connected to the address decoder 120 through word lines WL. The plurality of memory blocks BLK1 to BLKz are connected to the read and write circuit 130 through bit lines BL1 to BLm. Each of the plurality of memory blocks BLK1 to BLKz includes a plurality of memory cells. As an embodiment, the plurality of memory cells are non-volatile memory cells, and may be configured of non-volatile memory cells having a vertical channel structure. The memory cell array 110 may be configured as a memory cell array of a two-dimensional structure. According to an embodiment, the memory cell array 110 may be configured as a memory cell array of a three-dimensional structure. Meanwhile, each of the plurality of memory cells included in the memory cell array may store at least one bit of data. In an embodiment, each of the plurality of memory cells included in the memory cell array 110 may be a single-level cell (SLC) storing one bit of data. In another embodiment, each of the plurality of memory cells included in the memory cell array 110 may be a multi-level cell (MLC) storing two bits of data. In still another embodiment, each of the plurality of memory cells included in the memory cell array 110 may be a triple-level cell storing three bits of data. In still another embodiment, each of the plurality of memory cells included in the memory cell array 110 may be a quad-level cell storing four bits of data. According to an embodiment, the memory cell array 110 may include a plurality of memory cells each storing five or more bits of data.

The address decoder 120, the read and write circuit 130, the control logic 140, and the voltage generator 150 operate as a peripheral circuit that drives the memory cell array 110. The address decoder 120 is connected to the memory cell array 110 through the word lines WL. The address decoder 120 is configured to operate in response to control of the control logic 140. The address decoder 120 receives an address through an input/output buffer (not shown) inside the semiconductor memory device 100.

The address decoder 120 is configured to decode a block address among received addresses. The address decoder 120 selects at least one memory block according to the decoded block address. In addition, the address decoder 120 applies a program voltage Vpgm generated by the voltage generator 150 to a selected word line and applies a pass voltage Vpass to remaining unselected word lines during a program operation. In addition, the address decoder 120 applies a read voltage Vread generated by the voltage generator 150 to the selected word line of the selected memory block and applies the pass voltage Vpass to the remaining unselected word lines during a read operation. In addition, the address decoder 120 applies a verify voltage generated by the voltage generator 150 to the selected word line of the selected memory block and applies the pass voltage Vpass to the remaining unselected word lines during a program verify operation.

The address decoder 120 is configured to decode a column address of the received addresses. The address decoder 120 transmits the decoded column address to the read and write circuit 130.

A read operation and a program operation of the semiconductor memory device 100 are performed in a page unit. Addresses received at a time of a request of the read operation and the program operation include a block address, a row address, and a column address. The address decoder 120 selects one memory block and one word line according to the block address and the row address. The column address is decoded by the address decoder 120 and is provided to the read and write circuit 130.

The address decoder 120 may include a block decoder, a row decoder, a column decoder, an address buffer, and the like.

The read and write circuit 130 includes a plurality of page buffers PB1 to PBm. The read and write circuit 130 may operate as a "read circuit" during a read operation of the memory cell array 110 and may operate as a "write circuit" during a program operation of the memory cell array 110.

The plurality of page buffers PB1 to PBm are connected to the memory cell array 110 through the bit lines BL1 to BLm. During the program operation, the plurality of page buffers PB1 to PBm receive and temporarily store data to be programmed, and adjust a potential level of the bit lines BL1 to BLm based on the temporarily stored data. During the read operation and the program verify operation, in order to sense a threshold voltage of the memory cells, the plurality of page buffers PB1 to PBm sense a change of an amount of a current flowing according to a program state of a corresponding memory cell through a sensing node while continuously supplying a sensing current to the bit lines connected to the memory cells, and latches the sensed change as sensing data. The read and write circuit 130 operates in response to page buffer control signals output from the control logic 140.

During the read operation, the read and write circuit 130 senses data of the memory cell, temporarily stores read data, and outputs data DATA to the input/output buffer (not shown) of the semiconductor memory device 100. As an example of an embodiment, the read and write circuit 130 may include a column selection circuit, and the like, in addition to the page buffers (or page registers).

The control logic 140 is connected to the address decoder 120, the read and write circuit 130, and the voltage generator 150. The control logic 140 receives a command CMD and a control signal CTRL through the input/output buffer (not shown) of the semiconductor memory device 100. The control logic 140 is configured to control overall operations of the semiconductor memory device 100 in response to the control signal CTRL. In addition, the control logic 140 outputs a control signal for adjusting a sensing node precharge potential level of the plurality of page buffers PB1 to PBm. The control logic 140 may control the read and write circuit 130 to perform the read operation of the memory cell array 110.

The voltage generator 150 generates the program voltage Vpgm and the pass voltage Vpass during the program operation and generates the read voltage Vread and the pass voltage Vpass during the read operation in response to the control signal output from the control logic 140. In order to generate a plurality of voltages having various voltage levels, the voltage generator 150 may include a plurality of pumping capacitors that receive an internal power voltage, and generate the plurality of voltages by selectively activating the plurality of pumping capacitors in response to the control of the control logic 140. As described above, the voltage generator 150 may include the charge pump, and the charge pump may include the plurality of pumping capacitors described above. A specific configuration of the charge pump included in the voltage generator 150 may be variously designed as necessary.

The address decoder 120, the read and write circuit 130, and the voltage generator 150 may function as a "peripheral circuit" that performs the read operation, the program operation, and an erase operation on the memory cell array 110. The peripheral circuit performs the read operation, the program operation, and the erase operation on the memory cell array 110 based on the control of the control logic 140.

Figure 3:
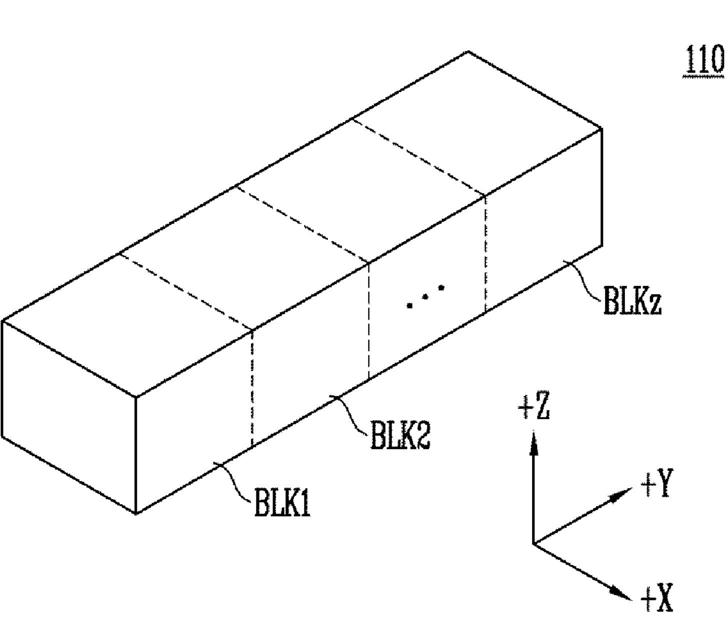
FIG. 3 is a diagram illustrating an embodiment of a memory cell array of FIG. 2.

FIG. 3 is a diagram illustrating an embodiment of the memory cell array of FIG. 2.

Referring to FIG. 3, the memory cell array 110 includes a plurality of memory blocks BLK1 to BLKz. Each memory block may have a three-dimensional structure. Each memory block includes a plurality of memory cells stacked on a substrate. Such plurality of memory cells are arranged along a +X direction, a +Y direction, and a +Z direction. A structure of each memory block is described with reference to FIGS. 4 and 5.

Figure 4:
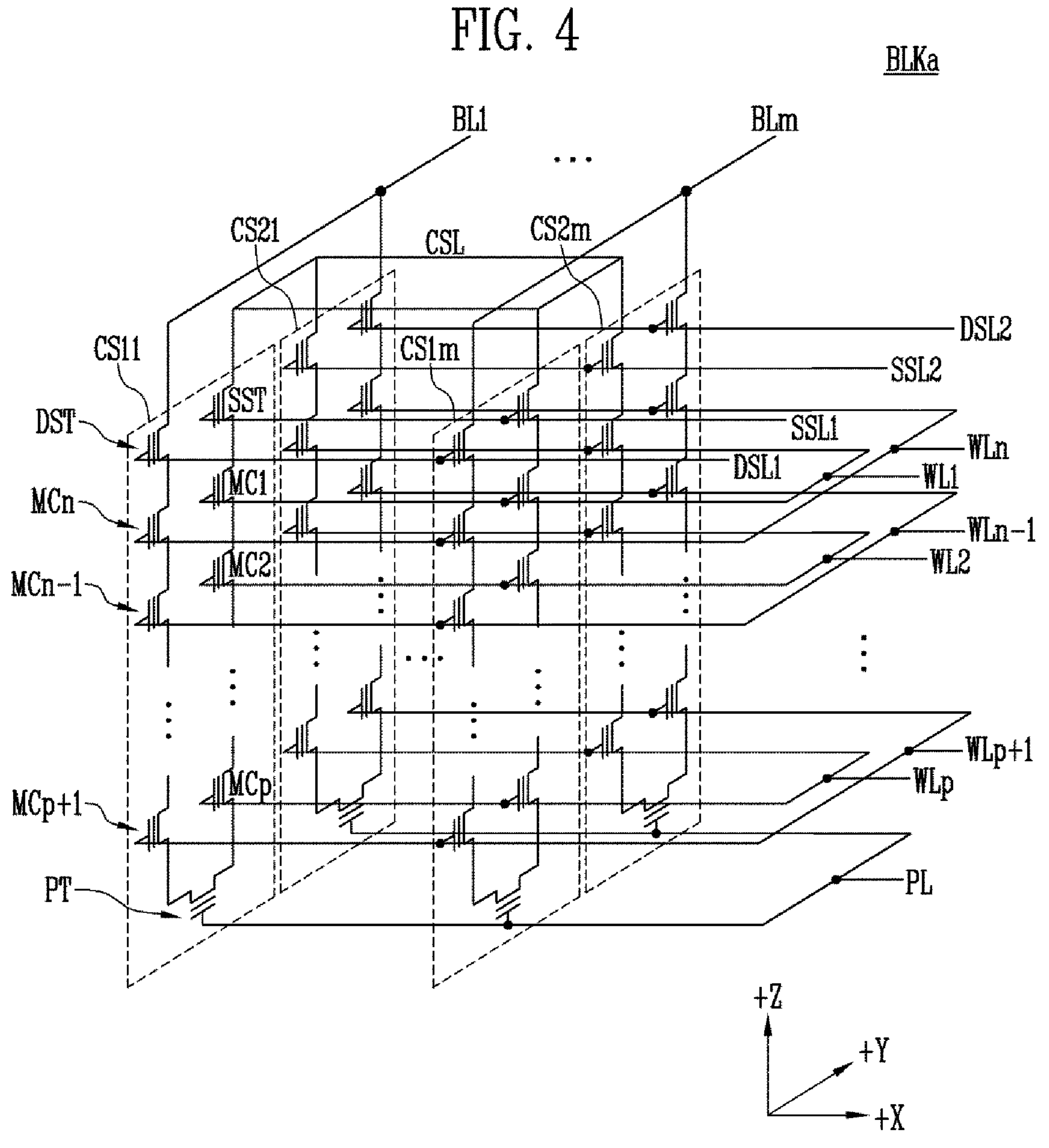
FIG. 4 is a circuit diagram illustrating any one memory block BLKa among memory blocks BLK1 to BLKz of FIG. 3.

FIG. 4 is a circuit diagram illustrating any one memory block BLKa among the memory blocks BLK1 to BLKz of FIG. 3.

Referring to FIG. 4, the memory block BLKa includes a plurality of cell strings CS11 to CS1*m* and CS21 to CS2*m*. As an embodiment, each of the plurality of cell strings CS11 to CS1*m* and CS21 to CS2*m* may be formed in a 'U' shape. In the memory block BLKa, m cell strings are arranged in a row direction (that is, the +X direction). In FIG. 4, two cell strings are arranged in a column direction (that is, the +Y direction). However, this is for convenience of description and it may be understood that three or more cell strings may be arranged in the column direction.

Each of the plurality of cell strings CS11 to CS1*m* and CS21 to CS2*m* includes at least one source select transistor SST, first to n-th memory cells MC1 to MCn, a pipe transistor PT, and at least one drain select transistor DST.

Each of the select transistors SST and DST and the memory cells MC1 to MCn may have a similar structure. As an embodiment, each of the select transistors SST and DST and the memory cells MC1 to MCn may include a channel layer, a tunneling insulating film, a charge storage film, and a blocking insulating film. As an embodiment, a pillar for providing the channel layer may be provided in each cell string. As an embodiment, a pillar for providing at least one of the channel layer, the tunneling insulating film, the charge storage film, and the blocking insulating film may be provided in each cell string.

The source select transistor SST of each cell string is connected between a common source line CSL and the memory cells MC1 to MCp.

As an embodiment, the source select transistors of the cell strings arranged in the same row are connected to a source select line extending in the row direction, and the source select transistors of the cell strings arranged in different rows are connected to different source select lines. In FIG. 4, the source select transistors of the cell strings CS11 to CS1*m* of a first row are connected to a first source select line SSL1. The source select transistors of the cell strings CS21 to CS2*m* of a second row are connected to a second source select line SSL2.

As another embodiment, the source select transistors of the cell strings CS11 to CS1*m* and CS21 to CS2*m* may be commonly connected to one source select line.

The first to n-th memory cells MC1 to MCn of each cell string are connected between the source select transistor SST and the drain select transistor DST.

The first to n-th memory cells MC1 to MCn may be divided into first to p-th memory cells MC1 to MCp and (p+1)-th to n-th memory cells MCp+1 to MCn. The first to p-th memory cells MC1 to MCp are sequentially arranged in a direction opposite to the +Z direction, and are connected in series between the source select transistor SST and the pipe transistor PT. The (p+1)-th to n-th memory cells MCp+1 to MCn are sequentially arranged in the +Z direction, and are connected in series between the pipe transistor PT and the drain select transistor DST. The first to p-th memory cells MC1 to MCp and the (p+1)-th to n-th memory cells MCp+1 to MCn are connected to each other through the pipe transistor PT. Gates of the first to n-th memory cells MC1 to MCn of each cell string are connected to the first to n-th word lines WL1 to WLn, respectively.

A gate of the pipe transistor PT of each cell string is connected to a pipeline PL.

The drain select transistor DST of each cell string is connected between a corresponding bit line and the memory cells MCp+1 to MCn. The drain select transistors of the cell strings arranged in the row direction are connected to the drain select line extending in the row direction. The drain select transistors of the cell strings CS11 to CS1*m* of the first row are connected to a first drain select line DSL1. The drain select transistors of the cell strings CS21 to CS2*m* of the second row are connected to a second drain select line DSL2.

The cell strings arranged in the column direction are connected to the bit lines extending in the column direction. In FIG. 4, the cell strings CS11 and CS21 of the first column are connected to the first bit line BL1. The cell strings CS1*m* and CS2*m* of the m-th column are connected to the m-th bit line BLm.

The memory cells connected to the same word line in the cell strings arranged in the row direction configure one page. For example, the memory cells connected to the first word line WL1, among the cell strings CS11 to CS1*m* of the first row configure one page. The memory cells connected to the first word line WL1, among the cell strings CS21 to CS2*m* of the second row configure another page. The cell strings arranged in one row direction may be selected by selecting any one of the drain select lines DSL1 and DSL2. One page of the selected cell strings may be selected by selecting any one of the word lines WL1 to WLn.

As another embodiment, even bit lines and odd bit lines may be provided instead of the first to m-th bit lines BL1 to BLm. In addition, even-numbered cell strings among the cell strings CS11 to CS1*m* or CS21 to SC2*m* arranged in the row direction may be connected to the even bit lines, and odd-numbered cell strings among the cell strings CS11 to CS1*m* or CS21 to CS2*m* arranged in the row direction may be connected to odd bit lines, respectively.

As an embodiment, at least one of the first to n-th memory cells MC1 to MCn may be used as a dummy memory cell. For example, at least one dummy memory cell is provided to reduce an electric field between the source select transistor SST and the memory cells MC1 to MCp. Alternatively, at least one dummy memory cell is provided to reduce an electric field between the drain select transistor DST and the memory cells MCp+1 to MCn. As more dummy memory cells are provided, reliability of an operation for the memory block BLKa is improved, however, the size of the memory block BLKa increases. As less dummy memory cells are provided, the size of the memory block BLKa may be reduced, however, the reliability of the operation for the memory block BLKa may be reduced.

In order to efficiently control at least one dummy memory cell, each of the dummy memory cells may have a required threshold voltage. Before or after an erase operation for the memory block BLKa, program operations for all or a part of the dummy memory cells may be performed. When the erase operation is performed after the program operation is performed, the dummy memory cells may have the required threshold voltage by controlling a voltage applied to dummy word lines connected to the respective dummy memory cells.

Figure 5:
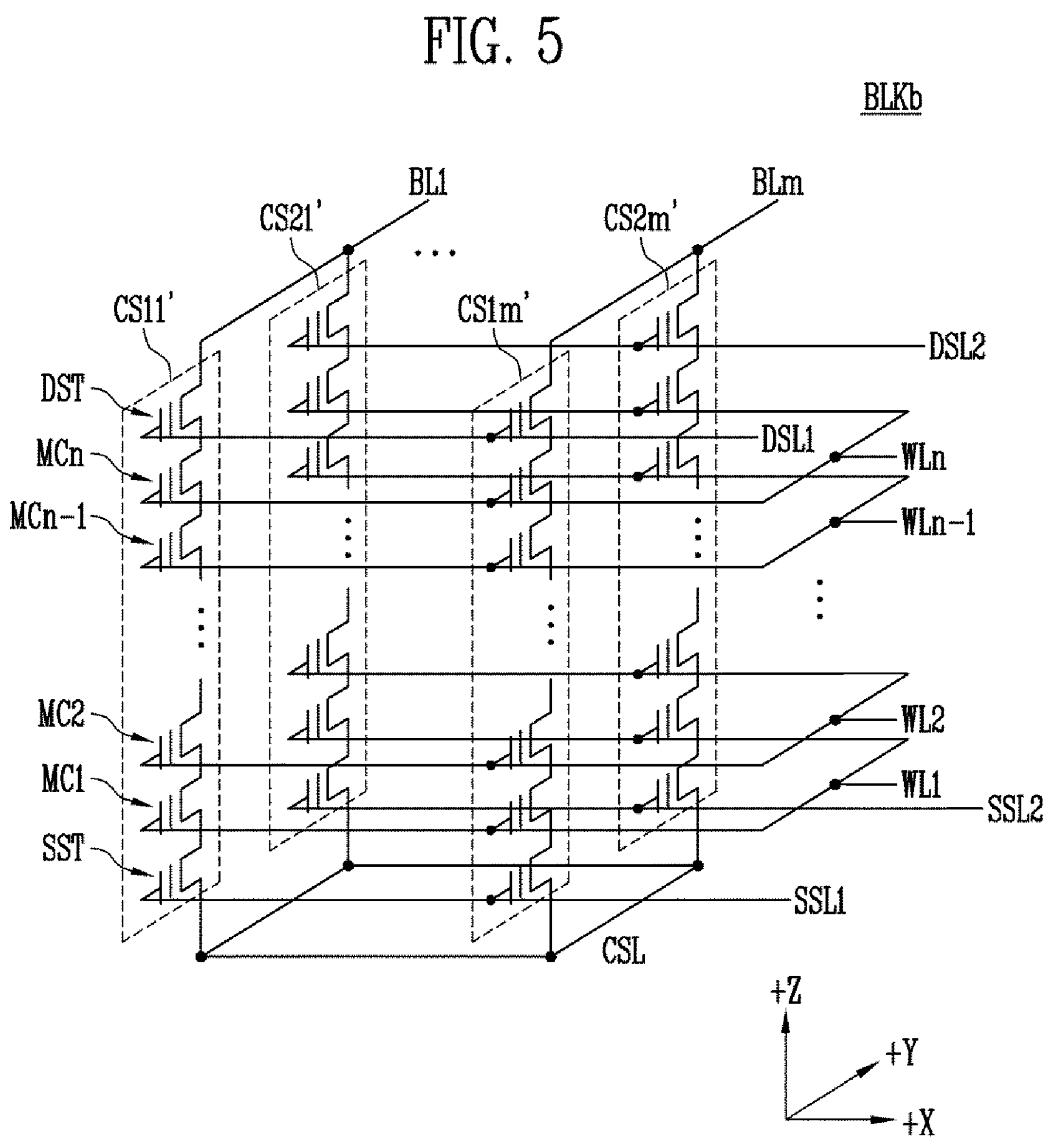
FIG. 5 is a circuit diagram illustrating another embodiment of any one memory block BLKb among the memory blocks BLK1 to BLKz of FIG. 3.

FIG. 5 is a circuit diagram illustrating another embodiment of any one memory block BLKb among the memory blocks BLK1 to BLKz of FIG. 3.

Referring to FIG. 5, the memory block BLKb includes a plurality of cell strings CS11' to CS1*m*' and CS21' to CS2*m*'. Each of the plurality of cell strings CS11' to CS1*m*' and CS21' to CS2*m*' extends along a +Z direction. Each of the plurality of cell strings CS11' to CS1*m*' and CS21' to CS2*m*' includes at least one source select transistor SST, first to n-th memory cells MC1 to MCn, and at least one drain select transistor DST stacked on a substrate (not shown) under the memory block BLK1'.

The source select transistor SST of each cell string is connected between a common source line CSL and memory cells MC1 to MCn. The source select transistors of the cell strings arranged in the same row are connected to the same source select line. The source select transistors of the cell strings CS11' to CS1*m*' arranged in a first row are connected to a first source select line SSL1. The source select transistors of the cell strings CS21' to CS2*m*' arranged in a second row are connected to a second source select line SSL2. As another embodiment, the source select transistors of the cell strings CS11' to CS1*m*' and CS21' to CS2*m*' may be commonly connected to one source select line.

The first to n-th memory cells MC1 to MCn of each cell string are connected in series between the source select transistor SST and the drain select transistor DST. Gates of the first to n-th memory cells MC1 to MCn are connected to first to the n-th word lines WL1 to WLn, respectively.

The drain select transistor DST of each cell string is connected between a corresponding bit line and the memory cells MC1 to MCn. The drain select transistors of the cell strings arranged in the row direction are connected to a drain select line extending in the row direction. The drain select transistors of the cell strings CS11' to CS1*m*' of a first row are connected to a first drain select line DSL1. The drain select transistors of the cell strings CS21' to CS2*m*' of a second row are connected to a second drain select line DSL2.

As a result, the memory block BLKb of FIG. 5 has an equivalent circuit similar to that of the memory block BLKa of FIG. 4 except that the pipe transistor PT is excluded from each cell string.

As another embodiment, even bit lines and odd bit lines may be provided instead of the first to m-th bit lines BL1 to BLm. In addition, even-numbered cell strings among the cell strings CS11' to CS1*m*' or CS21' to CS2*m*' arranged in the row direction may be connected to even bit lines, and odd-numbered cell strings among the cell strings CS11' to CS1*m*' or CS21' to CS2*m*' arranged in the row direction may be connected to odd bit lines, respectively.

As an embodiment, at least one of the first to n-th memory cells MC1 to MCn may be used as a dummy memory cell. For example, at least one dummy memory cell is provided to reduce an electric field between the source select transistor SST and the memory cells MC1 to MCn. Alternatively, at least one dummy memory cell is provided to reduce an electric field between the drain select transistor DST and the memory cells MC1 to MCn. As more dummy memory cells are provided, reliability of an operation for the memory block BLKb is improved, however, the size of the memory block BLKb increases. As fewer dummy memory cells are provided, the size of the memory block BLKb may be reduced, however, the reliability of the operation for the memory block BLKb may be reduced.

In order to efficiently control at least one dummy memory cell, each of the dummy memory cells may have a required threshold voltage. Before or after an erase operation for the memory block BLKb, program operations for all or a part of the dummy memory cells may be performed. When the erase operation is performed after the program operation is performed, the dummy memory cells may have the required threshold voltage by controlling a voltage applied to the dummy word lines connected to the respective dummy memory cells.

Figure 6:
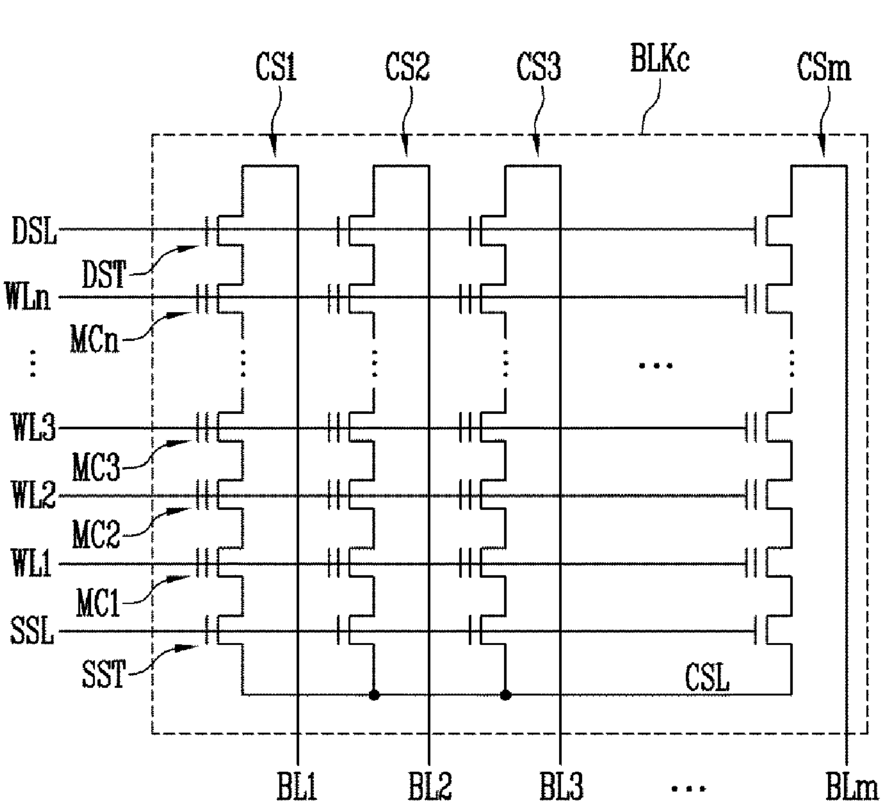
FIG. 6 is a circuit diagram illustrating another embodiment of any one memory block BLKc among the memory blocks BLK1 to BLKz of FIG. 3.

FIG. 6 is a circuit diagram illustrating another embodiment of any one memory block BLKc among the memory blocks BLK1 to BLKz of FIG. 3.

Referring to FIG. 6, the memory block BLKc includes a plurality of cell strings CS1 to CSm. The plurality of cell strings CS1 to CSm may be connected to a plurality of bit lines BL1 to BLm, respectively. Each of the cell strings CS1 to CSm includes at least one source select transistor SST, first to n-th memory cells MC1 to MCn, and at least one drain select transistor DST.

Each of the select transistors SST and DST and the memory cells MC1 to MCn may have a similar structure. As an embodiment, each of the select transistors SST and DST and the memory cells MC1 to MCn may include a channel layer, a tunneling insulating film, a charge storage film, and a blocking insulating film. As an embodiment, a pillar for providing the channel layer may be provided in each cell string. As an embodiment, a pillar for providing at least one of the channel layer, the tunneling insulating film, the charge storage film, and the blocking insulating film may be provided in each cell string.

The source select transistor SST of each cell string is connected between a common source line CSL and the memory cells MC1 to MCn.

The first to n-th memory cells MC1 to MCn of each cell string are connected between the source select transistor SST and the drain select transistor DST.

The drain select transistor DST of each cell string is connected between a corresponding bit line and the memory cells MC1 to MCn.

Memory cells connected to the same word line configure one page. The cell strings CS1 to CSm may be selected by selecting the drain select line DSL. One page among the selected cell strings may be selected by selecting any one of the word lines WL1 to WLn.

As another embodiment, even bit lines and odd bit lines may be provided instead of the first to m-th bit lines BL1 to BLm. Even-numbered cell strings among the cell strings CS1 to CSm may be connected to even bit lines, and odd-numbered cell strings may be connected to odd bit lines, respectively.

Figure 7:
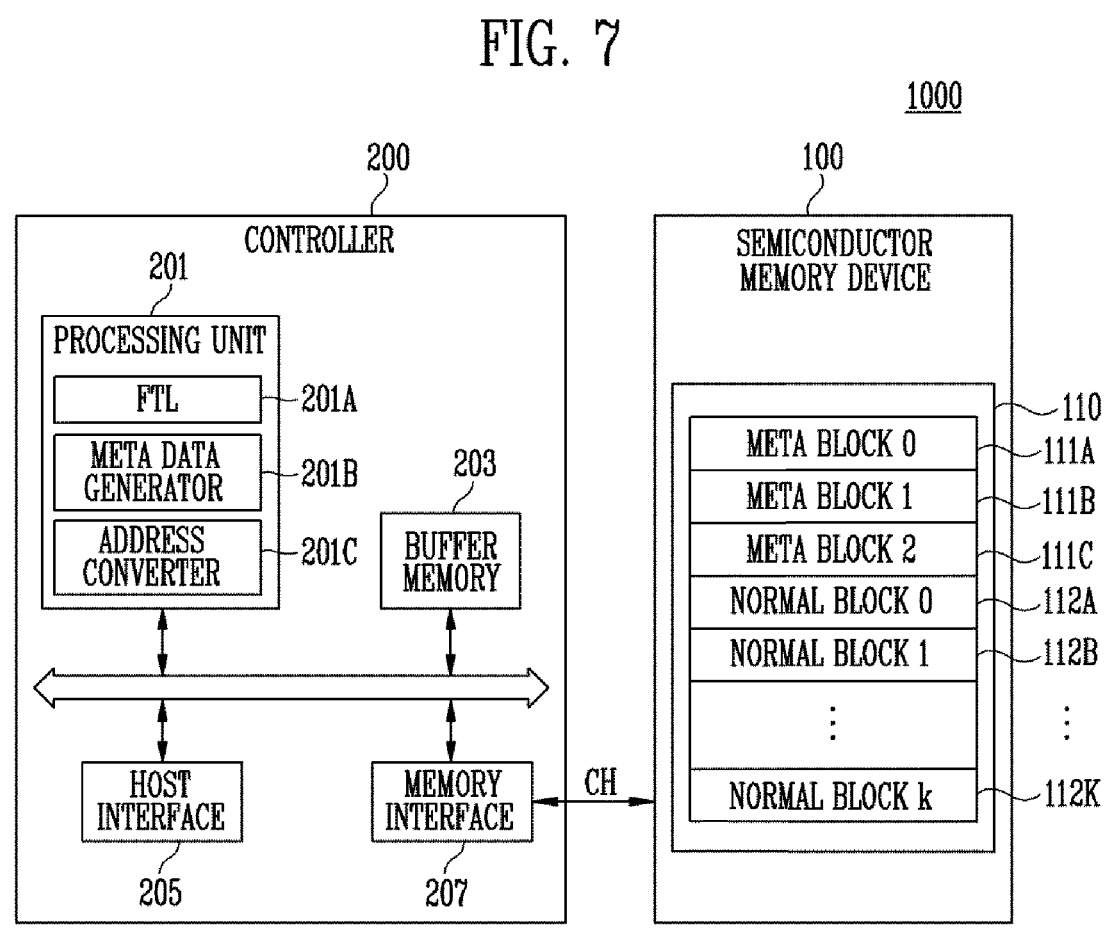

FIG. 7 is a block diagram illustrating a controller and a semiconductor memory device according to an embodiment of the present disclosure.

Referring to FIG. 7, the memory system 1000 includes the semiconductor memory device 100 and the controller 200. The semiconductor memory device 100 may be the semiconductor memory device described with reference to FIG. 2. The controller 200 corresponds to the controller 200 of FIG. 1. Hereinafter, a repetitive description is omitted.

The semiconductor memory device 100 may include the memory cell array 110. The memory cell array 110 of the semiconductor memory device 100 may include a plurality of meta blocks 111A to 111C and a plurality of normal blocks 112A to 112K. Each of the plurality of meta blocks 111A to 111C and the plurality of normal blocks 112A to 112K may correspond to each of the plurality of memory blocks BLK1 to BLKz described with reference to FIGS. 2 to 6.

In FIG. 7, a configuration except for the memory cell array 110 of the semiconductor memory device 100 is omitted.

Among the plurality of meta blocks 111A to 111C, a target meta block (for example, 111A) may store meta data of data stored in the plurality of normal blocks 112A to 112K. In an embodiment, the meta data may be data necessary for driving firmware. For example, the meta data may include information on command data corresponding to the command received from the host 300, information on the command operation corresponding to the command, information on the memory blocks of the semiconductor memory device 100 on which the command operation is performed, information on map data corresponding to the command operation, and the like. For example, the meta data may include logical address-physical address mapping data or map scan information of user data stored in the plurality of normal blocks 112A to 112K among the memory blocks of the semiconductor memory device 100.

The user data received from the host may be stored in the normal blocks 112A to 112K.

In an embodiment of the present disclosure, the target meta block (for example, 111A) among the plurality of meta blocks 111A to 111C may be divided into a plurality of sub blocks, and the meta data may be stored in at least one sub block of the plurality of sub blocks. In addition, among the plurality of sub blocks of the target meta block (for example, 111A), remaining sub blocks except for the at least one sub block in which the meta data is stored may be used as a replacement block and an auxiliary block. The replacement block may be a block for replacing a normal block determined as a bad block among the plurality of normal blocks 112A to 112K. That is, data stored in a block determined as the bad block may be moved to and stored in the replacement block, and the data stored in the replacement block may be read during the read operation. The auxiliary block may store information and data on an overall operation currently being performed during a sudden power off of the memory system. The information and data stored in the auxiliary block may be read and utilized to re-perform an overall operation stopped after power restoration.

In addition, among the plurality of meta blocks 111A to 111C, the remaining meta blocks 111B and 111C except for the target meta block (for example, 111A) may be utilized as an SLC block, an additional replacement block, and an overprovisioning block. The SLC block receives data to be stored in the plurality of normal blocks 112A to 112K from the controller 200 and stores the data during the write operation of the memory system. Thereafter, the data stored in the SLC block is moved to and stored in the plurality of normal blocks 112A to 112K. The SLC block may quickly and stably store data by programming the data received from the controller 200 in the SLC method. The data stored in the SLC block may be read and programmed to the normal blocks 112A to 112K in the MLC, triple level cell (TLC), or quad level cell (QLC) method. That is, the SLC block may serve as a buffer of data to be stored in the normal blocks 112A to 112K.

The controller 200 may include a processing unit 201, a buffer memory 203, a host interface 205, and a memory interface 207.

The processing unit 201 may include a micro control unit (MCU) and a central processing unit (CPU). The processing unit 201 may process a request transmitted from the host. In order to process the received request, the processing unit 201 may drive an instruction or an algorithm in a form of a code, that is, firmware, and control internal functional blocks and the semiconductor memory device 100.

The processing unit 201 may include a flash translation layer (FTL, hereinafter referred to as 'FTL') 201A, a meta data generator 201B, and an address converter 201C.

In the FTL 201A, the firmware may be stored in the buffer memory 203, an additional memory (not shown) directly connected to the processing unit 201, or a storage space in the processing unit 201. The FTL 201A may map a physical address corresponding to an address (for example, a logical address) input from the host during the write operation. In addition, the FTL 201A checks the physical address mapped to the logical address input from the host during the read operation. At this time, the mapping operation is performed based on the map data stored in the buffer memory 203. In addition, the FTL 201A may generate a command queue for controlling the semiconductor memory device 100 in response to the command received from the host.

The meta data generator 201B generates the meta data for the command operation based on the command received from the host. For example, the meta data may include information on command data corresponding to the command received from the host, information on the command operation corresponding to the command, information on the memory blocks of the semiconductor memory device 100 on which the command operation is performed, information on map data corresponding to the command operation, and the like. The meta data generator 201B may allocate an address corresponding to any one of the meta blocks 111A to 111C included in the semiconductor memory device 100 to the generated meta data.

The address converter 201C converts the address corresponding to the meta data generated by the meta data generator 201B into the address of the selected sub block among the sub blocks of the target meta block (for example, 111A). For example, the address corresponding to one of the plurality of meta blocks is allocated to the meta data generated by the meta data generator 201B, and the address converter 201C converts the allocated address of the meta data, that is, the address corresponding to one meta block, into the address of the selected sub block among the sub blocks of the target meta block (for example, 111A).

The buffer memory 203 may temporarily store program data received from the host or read data received from the semiconductor memory device 100. Meanwhile, the buffer memory 203 may store data necessary for driving the firmware, for example, the meta data. To this end, the meta data stored in at least one selected sub block of the target meta block 111A among the plurality of meta blocks 111A to 111C of the semiconductor memory device 100 may be read and stored in the buffer memory 203. In an embodiment, the buffer memory 203 may operate as a working memory of the processing unit 201.

The host interface 205 may interface the host and the memory system 1000. The buffer memory 203 may be configured of a random access memory such as dynamic random access memory (DRAM) or static random access memory (SRAM).

The memory interface 207 may control the semiconductor memory device 100 under control of the processing unit 201. The memory interface 207 may generate a command, an addresses, a control signal, and the like for controlling the semiconductor memory device 100 and transmit the command, the addresses, the control signal, and the like to the semiconductor memory device 100 through a channel CH. In addition, the memory interface 207 may receive data from the semiconductor memory device 100 through the channel CH.

Figure 8:
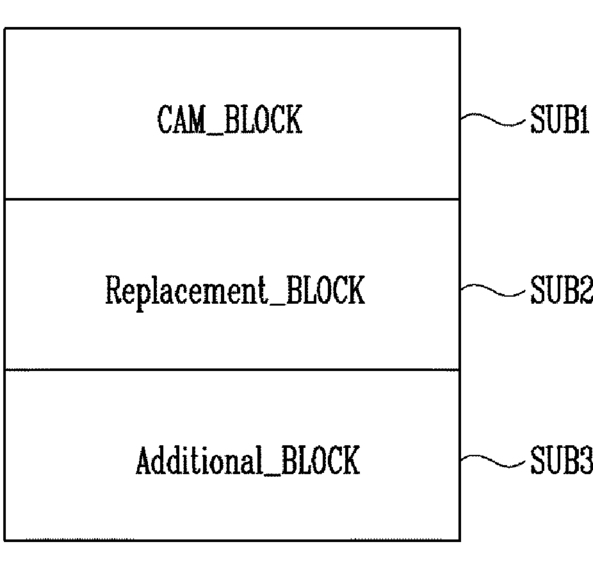
FIG. 8 is a block diagram illustrating any one meta block among meta blocks included in FIG. 7.

FIG. 8 is a block diagram illustrating any one meta block 111A among the meta blocks 111A to 111C of FIG. 7.

Referring to FIG. 8, the meta block 111A may be divided into a plurality of sub blocks SUB1 to SUB3. The plurality of sub blocks SUB1 to SUB3 may be defined as a CAM block CAM_BLOCK, a replacement block Replacement_BLOCK, and an auxiliary block Additional_BLOCK, respectively.

The CAM block CAM_BLOCK may be a sub block that stores the meta data received from the controller 200 of FIG. 7. The replacement block Replacement_BLOCK may be a sub block for replacing the normal block determined as the bad block among the normal blocks 112A to 112K of FIG. 7. The auxiliary block Additional_BLOCK may be a sub block that stores information and data on the overall operation of the semiconductor memory currently being performed during a sudden power off of the memory system.

When the meta block 111A is erased, an erase operation may be performed in a sub block unit in a partial erase method. That is, during the erase operation, a selected erase sub block among the plurality of sub blocks SUB1 to SUB3 may be selectively erased.

In an embodiment of the present disclosure, each of the meta blocks 111A to 111C has the same block unit as each of the normal blocks 112A to 112K of FIG. 7. That is, each of the meta blocks 111A to 111C may have the same circuit structure as each of the normal blocks 112A to 112K. In addition, each of the meta blocks 111A to 111C may be erased in a sub block unit, and each of the normal blocks 112A to 112K may be erased in a block unit (one memory block).

FIG. 9 is a flowchart illustrating a method of operating a memory system according to an embodiment of the present disclosure.

A meta data program method of the memory system is described with reference to FIGS. 1 to 9 as follows.

In step S910, when the command is received from the host 300, the controller 200 generates the meta data corresponding to the received command. For example, the meta data generator 201B generates the meta data for the command operation corresponding to the command received from the host 300.

In addition, the processing unit 201 of the controller 200 may generate a command CMD for controlling the semiconductor memory device 100 in response to the command received from the host 300, and the semiconductor memory device 100 may perform an overall operation such as the program operation, the read operation, and the erase operation in response to the command CMD.

In step S920, the controller 200 allocates the address of the meta block corresponding to the generated meta data. For example, the meta data generator 201B selects the meta block to which the generated meta data is to be programmed during the program operation and allocates the address of the selected meta block. For example, the meta data generator 201B may allocate the address of at least one meta block to which the meta data is programmed among the plurality of meta blocks 111A to 111C included in the semiconductor memory device 100 to the meta data.

In step S930, the controller 200 converts the address corresponding to one meta block allocated to the meta data into the address corresponding to the sub block of the target meta block. For example, the address converter 201C may converts the address corresponding to one meta block allocated to the meta data into the address of the sub block SUB corresponding to the CAM block CAM_BLOCK among the sub blocks SUB1 to SUB3 of the target meta block (for example, 111A).

In step S940, the semiconductor memory device 100 receives the meta data and the converted address corresponding to the meta data, that is, the address of the sub block SUB1 corresponding to the CAM block CAM_BLOCK of the target meta block 111A, from the controller 200, and stores the meta data in the sub block SUB1 of the target meta block 111A based on the address.

In step S950, the controller 200 allocates the remaining meta blocks 111B and 111C except for the target meta block 111A including the sub block SUB1 in which the meta data is stored among the plurality of meta blocks 111A to 111C included in the semiconductor memory device 100 as the SLC block, the replacement block, or the overprovisioning block.

After the above-described meta data program operation is completed, in order to replace the normal block determined as the bad block among the plurality of normal blocks 112A to 112K, the semiconductor memory device 100 may allocate at least one sub block (for example, SUB2) among the remaining sub blocks SUB2 and SUB3 except for the sub block SUB1 defined as the CAM block CAM_BLOCK and storing the meta data among the plurality of sub blocks SUB1 to SUB3 included in the target meta block 111A as the replacement block Replacement_BLOCK. In addition, the semiconductor memory device 100 may allocate at least one sub block (for example, SUB2) among the remaining sub blocks SUB2 and SUB3 except for the sub block SUB1 defined as the CAM block CAM_BLOCK and storing the meta data among the plurality of sub blocks SUB1 to SUB3 included in the target meta block 111A as the auxiliary block, and store the information and data on the overall operation currently being performed in the auxiliary block during sudden power off. The information and data stored in the auxiliary block may be read and utilized to re-perform the overall operation stopped after the power restoration.

In addition, the semiconductor memory device 100 may allocate the remaining meta blocks 111B and 111C except for the target meta block 111A including the sub block SUB1 in which the meta data is stored among the plurality of meta blocks 111A to 111C as the SLC block, the additional replacement block, and the overprovisioning block. Accordingly, memory block utilization of the memory system may be improved, and thus the performance of the memory system may be improved.

Figures 10, 11:
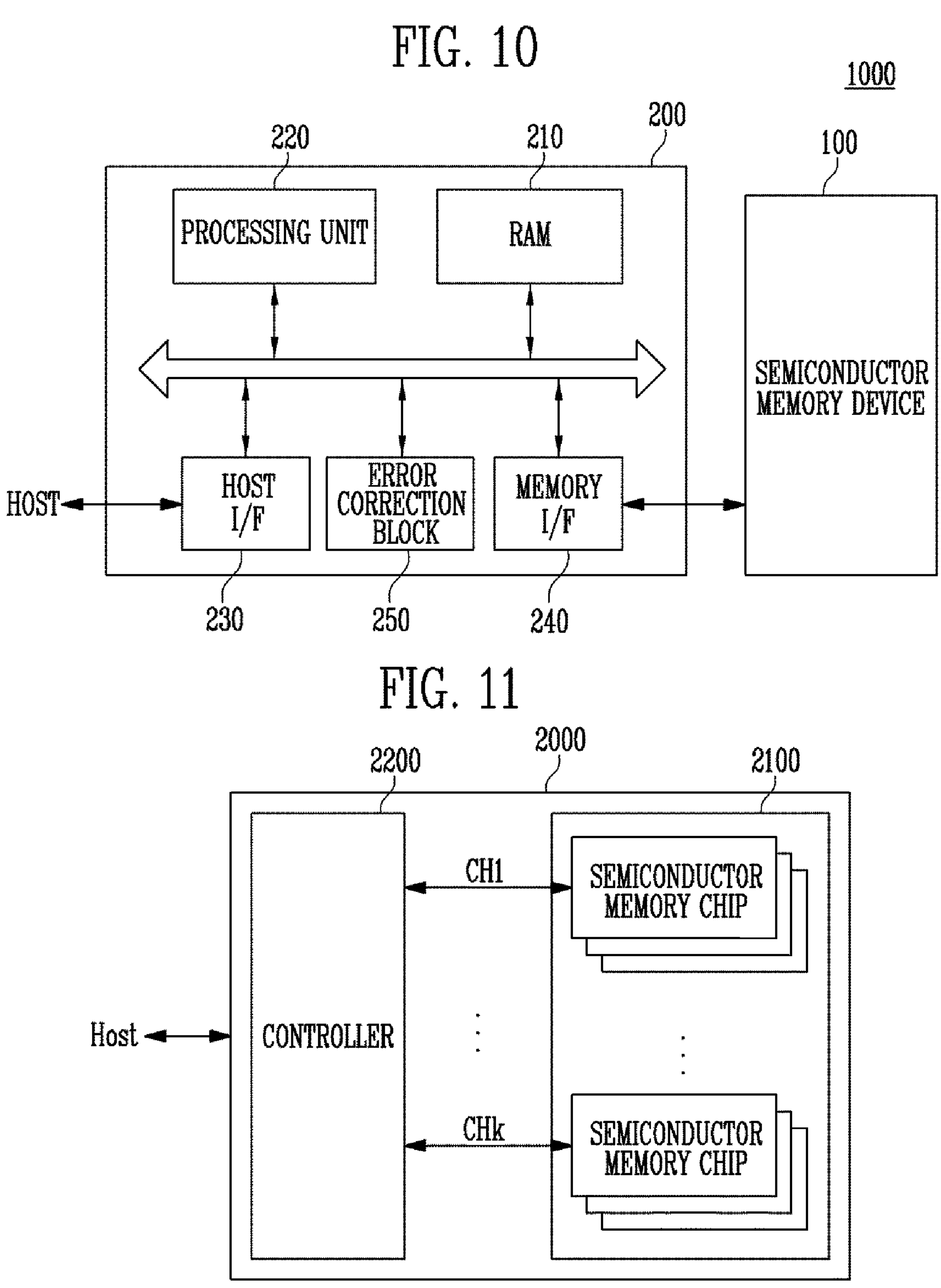
FIG. 10 is a block diagram illustrating an example of a controller shown in FIG. 1 or 7.
FIG. 11 is a block diagram illustrating an application example of the memory system of FIG. 1.

FIG. 10 is a block diagram illustrating an example of the controller shown in FIG. 1 or 7.

Referring to FIG. 10, the controller 200 is connected to the semiconductor memory device 100 and a host HOST. The semiconductor memory device 100 may be the semiconductor memory device described with reference to FIG. 7. The controller 200 corresponds to the controller 200 of FIG. 1 or 7. Hereinafter, a repetitive description is omitted.

The controller 200 is configured to access the semiconductor memory device 100 in response to a request from the host Host. For example, the controller 200 is configured to control read, write, erase, and background operations of the semiconductor memory device 100. The controller 200 is configured to provide an interface between the semiconductor memory device 100 and the host Host. The controller 200 is configured to drive firmware for controlling the semiconductor memory device 100.

The controller 200 includes a random access memory (RAM) 210, a processing unit 220, a host interface 230, a memory interface 240, and an error correction block 250. The RAM 210 is used as at least one of an operation memory of the processing unit 220, a cache memory between the semiconductor memory device 100 and the host Host, and a buffer memory between the semiconductor memory device 100 and the host Host. The RAM 210 of FIG. 10 may be substantially the same component as the buffer memory 203 of FIG. 7.

The processing unit 220 controls an overall operation of the controller 200. The processing unit 220 of FIG. 10 may be substantially the same component as the processing unit 201 of FIG. 7.

The host interface 230 includes a protocol for performing data exchange between the host Host and the controller 200. As an example of an embodiment, the controller 200 is configured to communicate with the host Host through at least one of various interface protocols such as a universal serial bus (USB) protocol, a multimedia card (MMC) protocol, a peripheral component interconnection (PCI) protocol, a PCI-express (PCI-E) protocol, an advanced technology attachment (ATA) protocol, a serial ATA protocol, a parallel ATA protocol, a small computer system interface (SCSI) protocol, an enhanced small disk interface (ESDI) protocol, an integrated drive electronics (IDE) protocol, and a private protocol. The host interface 230 of FIG. 10 may be substantially the same component as the host interface 205 of FIG. 7.

The memory interface 240 interfaces with the semiconductor memory device 100. For example, the memory interface 240 includes a NAND interface or a NOR interface. The memory interface 240 of FIG. 10 may be substantially the same component as the memory interface 207 of FIG. 7.

The error correction block 250 is configured to detect and correct an error of data received from the semiconductor memory device 100 using an error correcting code (ECC). The processing unit 220 may control the semiconductor memory device 100 to adjust a read voltage and perform re-read according to an error detection result of the error correction block 250. As an example of an embodiment, the error correction block may be provided as a component of the controller 200.

The controller 200 and the semiconductor memory device 100 may be integrated into one semiconductor device. As an example of an embodiment, the controller 200 and the semiconductor memory device 100 may be integrated into one semiconductor device to form a memory card. For example, the controller 200 and the semiconductor memory device 100 may be integrated into one semiconductor device to form a memory card such as a PC card (personal computer memory card international association (PCMCIA)), a compact flash card (CF), a smart media card (SM or SMC), a memory stick, a multimedia card (MMC, RS-MMC, or MMCmicro), an SD card (SD, miniSD, microSD, or SDHC), and a universal flash storage (UFS).

The controller 200 and the semiconductor memory device 100 may be integrated into one semiconductor device to form a semiconductor drive (solid state drive (SSD)). The semiconductor drive (SSD) includes the memory system 1000 configured to store data in a semiconductor memory. When the memory system 1000 including the controller 200 and the semiconductor memory device 100 is used as the semiconductor drive (SSD), an operation speed of the host connected to the memory system 1000 is dramatically improved.

As another example, the memory system 1000 including the controller 200 and the semiconductor memory device 100 is provided as one of various components of an electronic device such as a computer, an ultra-mobile PC (UMPC), a workstation, a net-book, a personal digital assistants (PDA), a portable computer, a web tablet, a wireless phone, a mobile phone, a smart phone, an e-book, a portable multimedia player (PMP), a portable game machine, a navigation device, a black box, a digital camera, a 3-dimensional television, a digital audio recorder, a digital audio player, a digital picture recorder, a digital picture player, a digital video recorder, and a digital video player, a device capable of transmitting and receiving information in a wireless environment, one of various electronic devices configuring a home network, one of various electronic devices configuring a computer network, one of various electronic devices configuring a telematics network, an RFID device, or one of various components configuring a computing system.

As an example of an embodiment, the semiconductor memory device 100 and the memory system including the same may be mounted as a package of various types. For example, the semiconductor memory device 100 or the memory system may be packaged and mounted in a method such as a package on package (PoP), ball grid arrays (BGAs), chip scale packages (CSPs), plastic leaded chip carriers (PLCC), a plastic dual in line package (PDIP), a die in waffle pack, die in wafer form, a chip on board (COB), a ceramic dual in line package (CERDIP), a plastic metric quad flat pack (MQFP), a thin quad flat pack (TQFP), a small outline integrated circuit (SOIC), a shrink small outline package (SSOP), a thin small outline package (TSOP), a system in package (SIP), a multi-chip package (MCP), a wafer-level fabricated package (WFP), or a wafer-level processed stack package (WSP).

FIG. 11 is a block diagram illustrating an application example of the memory system of FIG. 1.

Referring to FIG. 11, the memory system 2000 includes a semiconductor memory device 2100 and a controller 2200. The semiconductor memory device 2100 includes a plurality of semiconductor memory chips. The plurality of semiconductor memory chips are divided into a plurality of groups.

In FIG. 11, the plurality of groups communicate with the controller 2200 through first to k-th channels CH1 to CHk, respectively. Each semiconductor memory chip is configured and is operated similarly to that of the semiconductor memory device 100 described with reference to FIG. 2.

Each group is configured to communicate with the controller 2200 through one common channel. The controller 2200 is configured similarly to the controller 200 described with reference to FIG. 10 and is configured to control the plurality of memory chips of the semiconductor memory device 2100 through the plurality of channels CH1 to CHk.

FIG. 12 is a block diagram illustrating a computing system including the memory system described with reference to FIG. 11.

The computing system 3000 includes a central processing device 3100, a random access memory (RAM) 3200, a user interface 3300, a power supply 3400, a system bus 3500, and the memory system 2000.

The memory system 2000 is electrically connected to the central processing device 3100, the RAM 3200, the user interface 3300, and the power supply 3400 through the system bus 3500. Data provided through the user interface 3300 or processed by the central processing device 3100 is stored in the memory system 2000.

In FIG. 12, the semiconductor memory device 2100 is connected to the system bus 3500 through the controller 2200. However, the semiconductor memory device 2100 may be configured to be directly connected to the system bus 3500. At this time, a function of the controller 2200 is performed by the central processing device 3100 and the RAM 3200.

In FIG. 12, the memory system 2000 described with reference to FIG. 11 is provided. However, the memory system 2000 may be replaced with the memory system including the controller 200 and the semiconductor memory device 100 described with reference to FIG. 10.

The embodiments of the present disclosure disclosed in the present specification and drawings are merely provided with specific examples to easily describe the technical content of the present disclosure and to help understanding of the present disclosure, and are not intended to limit the scope of the present disclosure. Other modified examples based on the technical spirit of the present disclosure may be implemented in addition to the embodiments disclosed herein.

What is claimed is:

1. A memory system comprising:

a semiconductor memory device configured to include a plurality of memory blocks and a peripheral circuit, wherein the plurality of memory blocks are connected to the peripheral circuit through word lines and bit lines, and the plurality of memory blocks comprise a plurality of meta blocks; and a controller configured to control the semiconductor memory device to store meta data in in a selected meta block among the plurality of meta blocks, wherein the selected meta block includes:

a first sub-block used for storing the meta data, a second sub-block used for storing information and data on an overall operation currently being performed during a sudden power off of the memory system, and a third sub-block used for replacing a bad block among the plurality of memory blocks, and wherein the controller is further configured to:

allocate remaining meta blocks other than the selected meta block to store data other than the meta data, and allocate each of the first, second, and third sub-blocks for a respective function, and wherein the first sub-block, the second sub-block, the third sub-block are capable of being erased independently.

2. The memory system of claim 1, wherein the controller generates the meta data, allocates the selected meta block to the meta data, and converts an address of the meta data to an address of the first sub-block among a plurality of sub-blocks included in the selected memory block.

3. The memory system of claim 2, wherein the meta data include mapping information between logical addresses and physical addresses of data stored in the semiconductor memory device.

4. The memory system of claim 1, wherein the remaining meta blocks are used as at least one of a single-level cell (SLC) block, a replacement block, or an overprovisioning block.

5. A controller for controlling a semiconductor memory device including a plurality of memory blocks and a peripheral circuit, wherein the plurality of memory blocks are connected to the peripheral circuit through word lines and bit lines, and the plurality of memory blocks comprise a plurality of meta blocks the controller comprising:

a host interface configured to receive a command from an external host; and a processor configured to generate meta data related to the command and to control the semiconductor memory device to store the meta data in a portion of selected meta block among the plurality of meta blocks, wherein the selected meta block includes:

a first sub-block used for storing the meta data, a second sub-block used for storing information and data on an overall operation currently being performed during a sudden power off of the memory system, and a third sub-block used for replacing a bad block among the plurality of memory blocks, wherein the processor is further configured to:

allocate remaining meta blocks other than the selected meta block to store data other than the meta data, and allocate each of the first, second, and third sub-blocks for a respective function, and wherein the first sub-block, the second sub-block, the third sub-block are capable of being erased independently.

6. The memory system of claim 5, wherein the processing unit comprises:

a flash translation layer configured to generate a command queue for controlling the semiconductor memory device in response to a command received from the external host;

a meta data generator configured to generate the meta data for a command operation corresponding to the command; and an address converter configured to convert an address of the meta data generated by the meta data generator into an address of the first sub-blocks.

7. The memory system of claim 6, wherein the meta data includes information on command data corresponding to the command received from the external host, information on the command operation, information on normal blocks of the semiconductor memory device on which the command operation is performed, and information on map data corresponding to the command operation.

8. A method of operating a controller of a semiconductor memory device including a plurality of memory blocks and a peripheral circuit, wherein the plurality of memory blocks are connected to the peripheral circuit through word lines and bit lines, and the plurality of memory blocks comprise a plurality of meta blocks, the method comprising:

generating meta data in response to a command received from a host;

allocating one memory block among the plurality of meta blocks to store the meta data;

converting an address of the meta data into an address of a first sub-block among a plurality of sub-blocks included in the one memory block;

transmitting the meta data to the semiconductor memory device and storing the meta data in the first sub-block; and allocating remaining meta blocks other than the one memory block to store data other than the meta data, wherein the one memory block includes:

the first sub-block used for storing the meta data, a second sub-block used for storing information and data on an overall operation currently being performed during a sudden power off of the memory system, and a third sub-block used for replacing a bad block among the plurality of memory blocks, wherein the first sub-block, the second sub-block, the third sub-block are capable of being erased independently, and wherein each of the first, second, and third sub-blocks is allocated for a respective function.

* * * * *